July 3, 1962 L. E. ELFES 3,041,884
POWER TAKE-OFF DRIVE FOR TRACTORS
Filed Nov. 4, 1959 3 Sheets-Sheet 1

INVENTOR.
LEE E. ELFES
BY
Wolfe, Hubbard, Voit & Osann
ATTORNEYS.

July 3, 1962

L. E. ELFES 3,041,884

POWER TAKE-OFF DRIVE FOR TRACTORS

Filed Nov. 4, 1959

INVENTOR.
LEE E. ELFES
BY
Wolfe, Hubbard, Voit & Osann
ATTORNEYS.

July 3, 1962   L. E. ELFES   3,041,884
POWER TAKE-OFF DRIVE FOR TRACTORS
Filed Nov. 4, 1959   3 Sheets-Sheet 3

INVENTOR.
LEE E. ELFES
BY
Wolfe, Hubbard, Voit & Osann
ATTORNEYS.

3,041,884
POWER TAKE-OFF DRIVE FOR TRACTORS
Lee E. Elfes, Birmingham, Mich., assignor to Massey-Ferguson Inc., Racine, Wis., a corporation of Maryland
Filed Nov. 4, 1959, Ser. No. 850,910
4 Claims. (Cl. 74—15.86)

The invention relates to tractors of the type having power take-off shafts adapted to be driven selectively at speeds proportioned either to engine speed or the speed of the ground wheels and it is more particularly concerned with an improved drive for such power take-off shafts.

Power take-off drives of the above general character have heretofore utilized shiftable gears or the like for drivingly engaging the power take-off shaft selectively either with the power delivery shaft of the transmission or with an auxiliary shaft driven from the tractor engine independently of the transmission. To permit the shifting of such clutches without stopping the tractor engine, it has been customary to drive the auxiliary shaft through a separate clutch component incorporated in the main driving clutch. With that arrangement the transmission clutch must be disengaged with consequent stopping of the tractor before the auxiliary shaft can be stopped to permit operation of the power take-off clutch. A power take-off drive of the above type is disclosed in the Klemm U.S. Patent 2,817,408, issued December 24, 1957.

One object of the invention is to provide a power take-off drive affording all of the advantages of the prior drive arrangements which additionally permits the power take-off shaft to be started and stopped or shifted from one type of drive to the other without stopping the tractor.

Another object is to provide a power take-off drive which permits substantial simplification of the tractor main clutch without reducing the flexibility or versatility of the power take-off drive.

Other advantages and objects of the invention will become apparent from the following detailed description of the preferred embodiment illustrated in the accompanying drawings in which FIGURE 1 is a longitudinal sectional view through the body of a tractor equipped with a power take-off drive embodying the features of the invention.

While a preferred embodiment of the invention and its application to a particular tractor have been shown and will be described herein, it is to be understood that this is merely exemplary and is not intended to limit the invention to the specific form or application shown. The intention is to cover all modifications and adaptations falling within the spirit and scope of the invention as more broadly or generally characterized in the appended claims.

Figure 1:
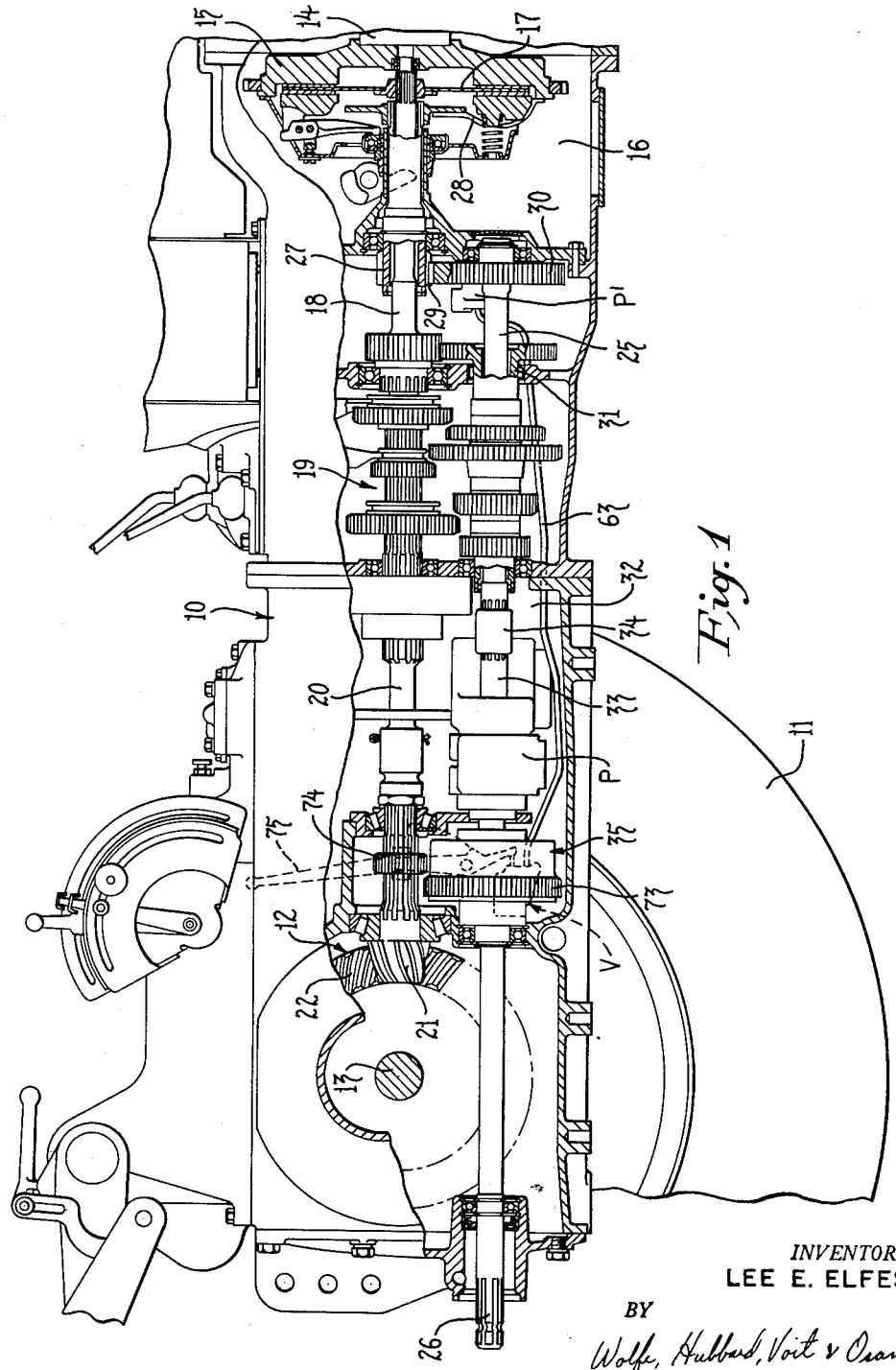

For purposes of illustration, the invention has been shown as incorporated in a tractor having a body or housing 10 (FIG. 1) adapted to be bolted at its forward end to an engine and supported at its rear end by a pair of rubber tired drive wheels 11. The wheels may be mounted on the tractor housing in any preferred manner and in this instance are driven through a differential 12 connected with the wheels by axle shafts 13.

In the exemplary tractor the engine crankshaft, indicated generally at 14, is fitted with a flywheel 15 enclosed within a clutch compartment 16 at the forward end of the housing 10. A friction clutch associated with the flywheel including a clutch plate 17, provides a disengageable drive for a shaft 18 which serves to connect the engine with a change-speed gear assembly or transmission 19. The transmission has the usual power delivery shaft 20 drivingly connected with the tractor differential 12 by a beveled pinion 21 meshing with the ring gear 22 of the differential. With this drive arrangement the tractor may be started and stopped by engaging and disengaging the clutch and the drive ratio between the engine and the drive wheels may be varied selectively by shifting the gears of the transmission in the usual and well-known manner.

In accordance with the invention an auxiliary shaft 25 driven from the tractor engine independently of the transmission is provided for driving a main pump P supplying power to the tractor hydraulic lift system and a power take-off shaft 26 projecting at the rear of the tractor body. The auxiliary shaft 25 is driven through the medium of a tubular shaft 27 adapted to be driven continuously from the flywheel 15 by its connection with a housing member 28 bolted or otherwise fixed to the flywheel and enclosing the transmission clutch. The shaft 27 is drivingly connected by a pinion 29 with a gear 30 fixed to the shaft 25 forwardly of the transmission.

In the particular tractor illustrated, the auxiliary shaft 25 extends rearwardly through the tubular intermediate shaft 31 of the transmission and projects into a compartment 32 in the tractor body at the rear of the transmission compartment. In this instance, the auxiliary shaft has an extension in the form of a short shaft 33 to which it is connected by a coupling 34. The extension shaft 34 serves to transmit power to a power take-off drive coupling or drive mechanism 35, to be described in detail hereinafter. It also constitutes the drive shaft for the pump P.

In carrying out the invention, the mechanism 35 is constructed to provide two separate coupling components 40 and 41, respectively, for drivingly connecting the power take-off shaft to the auxiliary shaft extension 34 or to the power delivery shaft 20 of the transmission. The coupling component 40 is preferably a friction clutch which can be safely engaged or disengaged when its driving shaft is rotating. The coupling component 41 may be a positive acting clutch or, as shown, a disengageable pinion and gear drive coupling as the relatively low speed of the shaft 20 permits such elements to be engaged or disengaged while the shaft is running.

Figure 2:
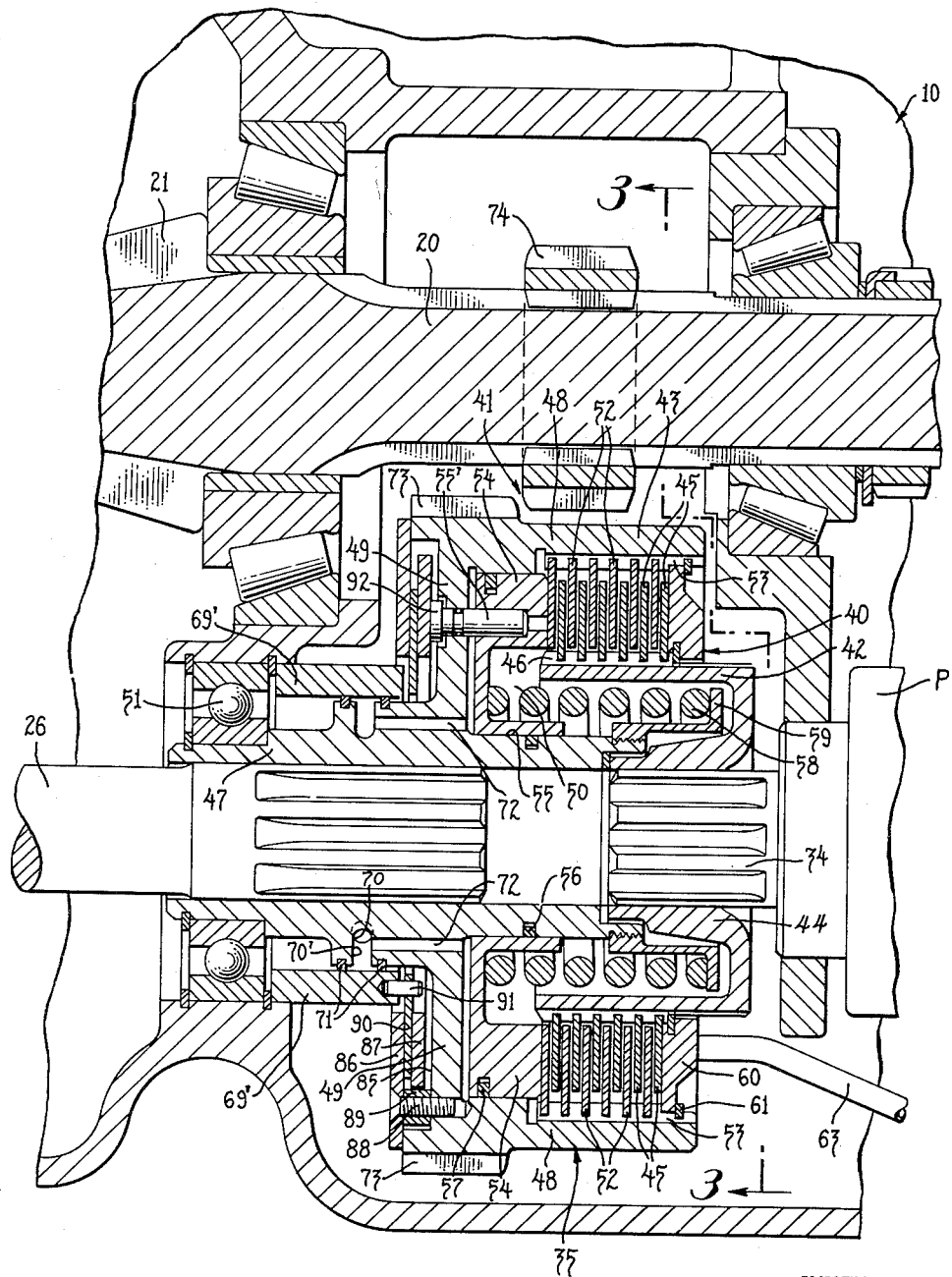
FIG. 2 is a fragmentary sectional view on an enlarged scale showing details of the power take-off drive coupling organization.

As shown in FIG. 2, friction clutch component 40 comprises driving and driven members 42 and 43 respectively fixed to the axially alined adjacent ends of the auxiliary shaft extension 34 and the power take-off shaft 26. The driving member 42 as shown is in the form of a hollow cylinder having an integral flange at one end joining it with an inwardly directed hub 44. The hub is splined to the end of the auxiliary shaft extension 34 for rotation with it. The member 42 carries a series of annular friction discs 45 which are fixed to the member for rotation by longitudinal splines 46 projecting outwardly from the peripheral face of the member. The splines engage in notches in the inner ends of the discs for providing a driving connection between the member and the discs while permitting the discs to slide axially of the member.

The driven clutch member 43 as herein shown comprises an elongated sleeve 47 joined intermediate its ends with a cylindrical casing member 48 by a web 49 integral with the sleeve and casing member. The sleeve and casing member thus define an annular open ended chamber 50 for the reception of the driving member 42 and its associated clutch discs. The sleeve has a splined connection with the power take-off shaft 26 and the end remote from the opening to the chamber 50 is machined to provide a seat for an anti-friction bearing 51 by which the clutch member and the shaft 26 are journaled on the tractor body.

The chamber 50 is dimensioned to receive the driving clutch member 42 and its set of clutch plates 45 together with a second set of clutch plates 52 which are interleaved with the first mentioned clutch plates as shown in FIG. 2. Longitudinal splines 53 on the inner wall of the casing member 48 engage in notches in the outer edges of the clutch plates 52 to drivingly connect the plates for rotation with the member while permitting limited axial sliding movements of the plates. It will be apparent that a friction driving connection between the two clutch members may be effected by pressing the two sets of clutch plates together in an axial direction.

In the exemplary clutch, power operated means is provided for pressing clutch plates 45 and 52 together to engage the clutch. The power operated means as shown comprises an annular piston 54 fitted into an annular operating cylinder 55 counterbored in the web 49 which forms the bottom wall of the chamber 50. The piston is constrained to rotate with the clutch member by pins 55' inserted through alined holes in the web 49 and the adjacent end of the piston. A sealing ring 56 seated in a groove in the sleeve 47 and a second sealing ring 57 seated in a groove in the outer peripheral wall of the piston seal the cylinder and piston assembly against leakage.

The piston 54 is normally urged to a retracted position by a coiled compression spring 58 interposed between the outer end face of the piston and a flanged collar 59 threaded or otherwise rigidly secured to the sleeve 47. Pressure on the clutch plates is thus relieved and the clutch disengaged or rendered ineffective to transmit torque from the driving to the driven clutch member. To engage the clutch, fluid under pressure is introduced into the cylinder 55 behind the piston, thereby shifting the piston outwardly or toward the assembled clutch plates. The plates are thus pressed together between the piston and an abutment or stop ring 60 fitted into the open end of the chamber 50 and restrained against movement by a snap ring 61.

Figure 3:
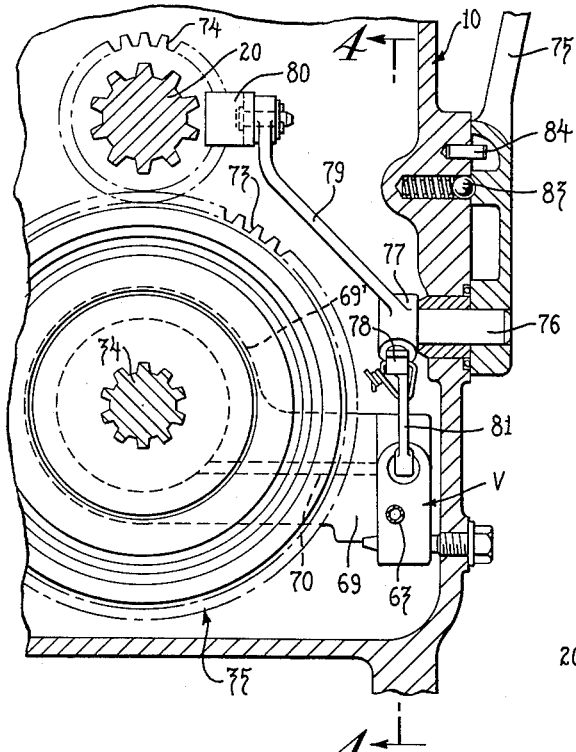
FIG. 3 is a fragmentary transverse sectional view through the tractor body taken in a plane substantially on the line 3—3 of FIG. 2.
Figure 4:
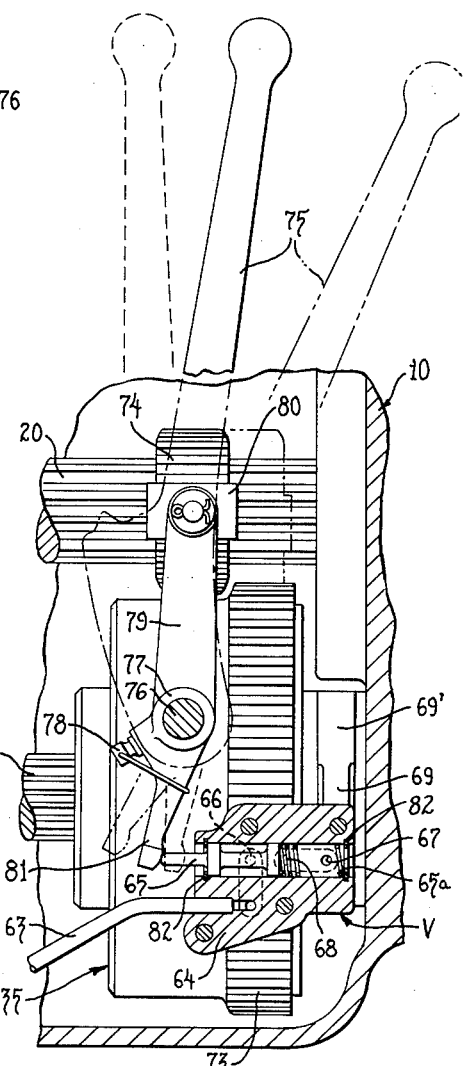
FIG. 4 is a fragmentary sectional view substantially on the line 4—4 of FIG. 3.

Fluid is directed to and exhausted from the cylinder 55 under control of a valve V (FIGS. 1, 3 and 4) connected to receive pressure from a continuously driven pump P1 by way of a conduit 63. As shown in FIG. 4, the valve comprises a casing 64 having a bore housing a slidable valve plunger 65. Conduit 63 delivers pressure fluid to the bore through an inlet port 66 adjacent one end of the bore. An exhaust port 67 adjacent the other end of the bore opens to the interior of the tractor body which consitutes a sump for oil used in the hydraulic system. An outlet port 68 intermediate the inlet and exhaust ports and connected with the cylinder 55 is adapted to be placed in communication alternately with the inlet and exhaust ports by the valve plunger 65.

In the particular embodiment illustrated the valve V is mounted on an arm 69 (FIG. 3) extending laterally from a collar 69 (FIG. 2) mounted in the tractor body in position to encircle the aft end of the sleeve 47 of the driven clutch member. A passage 70 extends through the arm 69 from the valve outlet port 68 and opens through the interior of the collar to a peripheral groove 70' formed in the sleeve 47. Sealing rings 71 interposed between the sleeve and the inner wall of the collar confine the pressure fluid to the groove. A series of passages 72 drilled through the web 49 connect the groove with the cylinder 55.

As will be seen by reference to FIG. 4, a spring 76 normally urges the plunger 65 to a position in which it is effective to establish communication between the outlet port 68 and the exhaust port 67. Fluid is thus permitted to exhaust from the cylinder 55 by way of the passages above described as the piston 54 is forced back into the cylinder by the spring 58 to disengage the clutch. When shifted to its alternate position, valve plunger 65 establishes communication between the inlet port 66 and outlet port 68 to direct pressure fluid to the cylinder 55 and piston 54 is shifted in a direction to engage the clutch.

The driven clutch member 43 of the friction clutch 40 component also serves as the driven member of the positive drive coupling 41. For this purpose, the casing portion 48 of the clutch member is formed with gear teeth 73. As will be seen by reference to FIGS. 1–4, the auxiliary and power take-off shafts 34 and 26 are axially alined and are supported in laterally spaced parallel relation to the power delivery shaft of the transmission. The location and spacing of the shafts is such that the gear defined by the teeth 73 is positioned for meshing engagement with a pinion 74 mounted on the power delivery shaft and constituting the driving member of the drive coupling 41. As shown in FIG. 4, the pinion 74 is splined to the shaft 20 for rotation with it and for sliding movement axially of the shaft into or out of meshing engagement with the gear teeth 73. The gear and pinion thus constitute a positively acting drive coupling for completing a driving connection with the power take-off shaft.

Suitable means is provided for actuating the driven members of the drive coupling so that the drive couplings 40 and 41 may be engaged alternately or both may be disengaged simultaneously. The actuating means as shown in FIGS. 3 and 4 includes a hand lever 75 pivotally mounted intermediate its ends on the tractor body 10 as by a short shaft 76 to which the lever may be secured by a set screw or the like. The shaft 76 extends into the drive coupling compartment of the tractor body and on its inner end carries a bell crank lever mounted on the shaft by means of an integrally formed hub 77 non-rotatably fixed to the shaft as by a set screw 78.

One arm 79 of the bell crank is extended inwardly and upwardly alongside the pinion 74 and is fitted with shifter fingers 80 embracing the pinion. The arrangement is such that the pinion is shifted along the shaft and into engagement with the teeth 73 when the lever 75 is rocked forwardly (to the right as viewed in FIG. 4) from the neutral position in which it is shown in full lines in FIG. 4.

With the gear and pinion engaged a drive connection is established for driving the power take-off shaft 26 at a speed proportioned to the rotational speed of the tractor drive wheels 11, or, in other words, to the rate at which the tractor is traveling over the ground. When the lever 75 is swung back to the neutral position or beyond that position (leftward) the pinion 74 is withdrawn from engagement with the teeth 73 and the clutch 41 is disengaged to interrupt the ground wheel drive to the power take-off shaft.

The other arm 81 of the actuating bell crank is positioned for cooperation with the stem of the valve plunger 65 as shown in FIG. 4. This lever arm is angularly disposed with respect to the arm 79 so that it is retracted from the path of the valve plunger when the lever is in neutral position or rocked forwardly (to the right) from neutral position to engage the power take-off shaft ground wheel drive. Under such conditions, spring 76 shifts the valve plunger to the position shown in FIG. 4, thus venting the clutch actuating cylinder 55 with consequent disengagement of the friction clutch 40. A snap ring 82 fitted into the outer end of the valve bore prevents the plunger from leaving the bore when the lever arm is retracted.

By swinigng the lever arm rearwardly from the neutral position (to the left) as shown in FIG. 4, the valve plunger 65 is shifted to clutch engaging position. More particularly, the plunger 65 is positioned for establishing communication between the inlet and outlet ports 66 and 68, thereby directing a flow of pressure fluid into the cylinder 55. The piston 54 is accordingly advanced to press the clutch plates 52 and 45 together and thus complete the driving connection from the auxiliary shaft to the power take-off shaft. As the auxiliary shaft is driven directly from the engine flywheel, the rotative speed of the power take-off shaft is directly proportioned to engine speed.

Yieldable detent means is desirably provided for releasably retaining the control lever 75 in any of the three positions in which it may be set. As shown in FIG. 3, the detent means comprises a steel ball 83 seated in a recess in the side wall of the tractor body 10 and urged outwardly by a spring into suitably spaced recesses in the overlying portion of the lever. A stop pin 84 provided on the tractor body and engaging in an arcuate slot in the lever defines the limit positions to which it may be swung.

To facilitate engagement and disengagement of the drive coupling while the shafts 20 and 34 are rotating, brake means is incorporated in the coupling assembly 35 for slowing down or stopping the driven coupling member 43 upon disengagement of the friction clutch 40. For this purpose, the outer end face of the web 49 is recessed as at 85 for the accommodation of a pair of annular friction rings 86 and 87. In the particular embodiment illustrated, the ring 86 is dimensioned to extend beyond the edges of the recess and is rigidly secured to the clutch member as by screws 88. The ring 87, on the other hand, is dimensioned to fit within the recesses 85. Its edge portion is suitably notched for loose engagement with bushings 89 fitted on the screws 88 within the recess. The ring 87 is thus floatingly mounted, being restrained by the bushings against rotation relative to the member 43 but permitted limited movement toward and from the companion ring 86.

Interposed between the rings 86 and 87 is a stationary ring 90 nonrotatably anchored to the collar 69' by one or more pins 91. The ring 90 is thus effective to exert frictional resistance to the rotation of the member 43 when the plates 86, 87 and 90 are pressed together.

Provision is made for applying brake engaging pressure to the floating ring 87 as an incident to the disengagement of the friction clutch 40. For this purpose a series of headed actuating shoes 92 have their shanks socketed in the holes for the plunger restraining pins 55'. The shoes, one of which is shown in FIG. 2, are positioned with their heads engaging the inner face of the ring 87. The holes for the restraining pins are formed with shoulders adjacent their inner ends and the pins are so dimensioned that the shoulders act to push the pins and shoes outwardly as the piston 54 approaches its fully retracted position under the urging of the spring 58. Release of the brake is effected automatically upon advance of the piston to engage the friction clutch.

It will be apparent from the foregoing that the invention provides an improved drive coupling assembly for selectively connecting the power take-off shaft of a tractor to be driven at rates proportioned either to engine speed or to tractor ground speed. The assembly includes novel power operated friction clutch means which permits engagement and disengagement of the power take-off drive without requiring the tractor to be stopped. Additionally, it permits a substantial simplification of the tractor main clutch.

I claim as my invention:

1. The combination in a tractor having a speed change transmission with a power input shaft driven from the tractor engine through a main clutch and a power delivery shaft for driving the rear traction wheels of the tractor, a power take-off shaft projecting at the rear of the tractor, an auxiliary shaft driven from the tractor engine independently of said main clutch, a sliding gear drive operable to establish a positive driving connection from the power delivery shaft to said power take-off shaft, a clutch operable to establish a driving connection from said auxiliary shaft to said power take-off shaft, through the medium of a series of coacting friction elements engageable while the auxiliary shaft is rotating, and manually operable control means including a hand lever effective in one position to engage said positively acting drive and disengage said friction clutch, effective in a second position to disengage both said drive and said clutch, and effective in a third position to disengage said positively acting drive and to engage said friction clutch.

2. The combination in a tractor having a speed change transmission with a power input shaft driven from the tractor engine through a main friction clutch and a power delivery shaft for driving the rear traction wheels of the tractor, a power take-off shaft projecting at the rear of the tractor, an auxiliary shaft driven from the tractor engine independently of said main clutch and including an extension disposed parallel to and spaced laterally from the power delivery shaft, said auxiliary shaft extension being axially alined with said power take-off shaft, driving and driven clutch members respectively fixed to the auxiliary shaft extension and to the power take-off shaft, friction elements operative when actuated to drivingly connect said clutch members to complete a driving connection from the tractor engine to said power take-off shaft independently of the main clutch, said friction elements permitting engagement or disengagement of the clutch while the auxiliary shaft is rotating, gear teeth formed on said driven clutch member, a pinion splined to the power delivery shaft for sliding movement into and out of mesh with said gear teeth, said pinion when meshed with the gear teeth completing a driving connection from the power delivery shaft to said power take-off shaft, a hand lever operable to shift said pinion into and out of meshing engagement with said gear teeth, and means operated by said hand lever for controlling the actuation of said friction elements, said last mentioned means being related to said hand lever so as to interrupt both drives for the power take-off shaft in one position, to establish one drive for that shaft when moved in one direction from said one position and to establish the other drive for that shaft when moved in the opposite direction from said one position.

3. The combination in a tractor having a speed change transmission with a power input shaft driven from the tractor engine through a main friction clutch and a power delivery shaft for driving the rear traction wheels of the tractor, a power take-off shaft projecting at the rear of the tractor, an auxiliary shaft driven from the tractor engine independently of said main clutch and including an extension disposed parallel to and spaced laterally from the power delivery shaft, said auxiliary shaft extension being axially alined with said power take-off shaft, driving and driven clutch members respectively fixed to the auxiliary shaft extension and to the power take-off shaft, said clutch members carrying interleaved clutch plates operative when pressed together to effect a friction driving connection between the clutch members which may be engaged or disengaged while the auxiliary shaft is rotating, a cylinder and piston actuator carried by said driven clutch member operative to press said clutch plates together, spring means acting on said piston normally urging it in a direction to relieve the pressure on said clutch plates and thereby disengage the clutch, a valve controlling the delivery of pressure fluid to and exhaust of fluid from said actuator, a coupling element rotatable with the power delivery shaft and movable into and out of driving engagement with said driven clutch member, and a hand lever operable to shift said coupling element and to operate said valve, said coupling element and said valve being related to the hand lever to permit engagement of the clutch and coupling alternately or simultaneous disengagement of both clutch and coupling.

4. The combination in a tractor having a speed change transmission with a power input shaft driven from the tractor engine through a main clutch and a power delivery shaft for driving the rear traction wheels of the tractor, a power take-off shaft projecting at the rear of the tractor, an auxiliary shaft driven from the tractor engine independently of the main clutch, a clutch mechanism and a drive coupling operative to establish drive connections for said power take-off shaft from said auxiliary shaft and the power delivery shaft alternatively, said mechanism and coupling including a driven member fixed to said power take-off shaft, a first driving member rotatably driven by said auxiliary shaft, a second driving member rotatably driven by the power delivery shaft, means operable selectively to drivingly engage either driving member with said driven member, brake means mounted on said driven member operable to impose frictional resistance to the rotation of the member, and means for operating and releasing said brake means incident to the engagement and disengagement of the first driving member and the driven member.

References Cited in the file of this patent

UNITED STATES PATENTS

| | | |
|---|---|---|
| 1,678,384 | Graves | July 24, 1928 |
| 1,784,354 | Haussmann | Dec. 9, 1930 |
| 2,817,408 | Klemm | Dec. 24, 1957 |
| 2,975,656 | Haverlender | Mar. 21, 1961 |

FOREIGN PATENTS

| | | |
|---|---|---|
| 1,153,067 | France | Feb. 28, 1958 |
| 799,012 | Great Britain | July 30, 1958 |